(12) United States Patent
Fujii

(10) Patent No.: US 7,704,427 B2
(45) Date of Patent: Apr. 27, 2010

(54) PROCESS FOR PRODUCING RESINOUS LAMINATED MEMBER

(75) Inventor: Tetsuya Fujii, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 599 days.

(21) Appl. No.: 11/453,227

(22) Filed: Jun. 15, 2006

(65) Prior Publication Data

US 2006/0284335 A1 Dec. 21, 2006

(30) Foreign Application Priority Data

Jun. 20, 2005 (JP) .............................. 2005-179463

(51) Int. Cl.
*B29C 45/14* (2006.01)
(52) U.S. Cl. ..................... 264/254; 264/248; 264/255; 264/259; 264/297.2
(58) Field of Classification Search ................ 264/255, 264/259, 263, 266, 269, 279.1, 297.2, 297.4, 264/248, 250, 254
See application file for complete search history.

(56) References Cited

U.S. PATENT DOCUMENTS 4,115,506 A * 9/1978 Shima ........................ 264/250

5,043,114 A * 8/1991 Saito et al. .................. 264/46.6
2004/0125023 A1* 7/2004 Fujii et al. ............ 343/700 MS

FOREIGN PATENT DOCUMENTS

JP 2003252136 A * 9/2003
JP A-2004-251868 9/2004

* cited by examiner

*Primary Examiner*—Joseph S Del Sole
*Assistant Examiner*—Timothy Kennedy
(74) *Attorney, Agent, or Firm*—Posz Law Group, PLC

(57) ABSTRACT

A process for producing a resinous laminated member, which is provided with an inclining first resinous layer, a decorated layer disposed parallelly to the first resinous layer, a second resinous layer disposed parallelly to the first resinous layer and an engaging portion extending obliquely to the first resinous layer, includes the steps of molding a primary molded product by molding the first resinous layer with a first forming mold's first-inner-surface molding cavity surface and at the same time shaping a film, which makes the decorated layer, with the first-inner-surface molding cavity surface while extending the film parallelly to the first-inner-surface molding cavity surface's extending direction, and molding the second resinous layer integrally with the primary molded product with a second forming mold while disposing the primary molded product parallelly to the obliquely-extending direction of the produced resinous laminated member's engaging portion in the second forming mold.

9 Claims, 5 Drawing Sheets

PROCESS FOR PRODUCING RESINOUS LAMINATED MEMBER

BACKGROUND OF THE INVENTION

1. Field of the Invention

The present invention relates to a process for producing a resinous laminated member. Specifically, it relates to a process for producing a resinous laminated member, which comprises a first resinous layer, a second resinous layer and a decorated layer disposed to interpose between the first and second resinous layers, utilizing a film in-mold method. The present invention can be used suitably when producing electric-waves transmittable cover members. For example, an electric-waves transmittable cover member is disposed in an exterior component part, which is provided with a radar device in the rear and which has an opening formed therein. Specifically, the electric-waves transmittable cover member is disposed in the opening of the exterior component part so as to cover the opening. Thus, the electric-waves transmittable cover member can transmit electric waves, such as extremely-high-frequency waves and microwaves, which radar devices transmit and/or receive.

2. Description of the Related Art

As such an on-vehicle radar device, the following are available: laser type radar devices, which utilize laser beams; and electric-wave type radar devices, which utilize electric waves, such as extremely-high-frequency waves and microwaves. Among them, electric-waves type radar devices have been attracting engineers' attention, because they are less likely to be susceptible to environmental influences, such as rain, snow and fog, than laser type radar devices are. Moreover, electric-waves type radar devices can contribute to downsizing antennas, because short-wavelength electric waves, such as extremely-high-frequency waves, are good in terms of the rectilinearity and directivity.

Such on-vehicle radar devices transmit extremely-high-frequency waves, and receive extremely-high-frequency waves, which are reflected at physical objects after running into them. Thus, the on-vehicle radar devices are used for the purpose of detecting obstacles present in front of a vehicle, or measuring the distance between vehicles. Accordingly, on-vehicle radar devices have been disposed in the rear of a front grill, an exterior component part, which is disposed on the front surface of a vehicle. However, a front grill itself has been provided with a large number of ventilation openings for taking air in into the engine room of a vehicle. Moreover, the front grill's surface has been often subjected to metallic plating. Thus, the front grill is constructed so that electric waves, such as extremely-high-frequency waves which exhibit high reflection coefficients with respect to metal, are less likely to transmit through it satisfactorily. If a front grill is provided with an opening, which is positioned in front of an on-vehicle radar device, for permeating electric waves, it is possible to transmit electric waves through the opening. However, when such a front grill is left as it is without taking any precautions, it is possible to see the inside of an engine room, that is, the on-vehicle radar device disposed therein, through the opening. Consequently, such a front grill has impaired the decorativeness of a vehicle. Hence, a front garnish has been disposed in the opening for permeating electric waves, opening which is formed in a front grill, in order to enhance the decorativeness and electric-waves transmittability of the front grill. Note that such a front garnish is composed of an electric-waves transmittable material so that it works as an electric-waves transmittable cover member.

Japanese Unexamined Patent Publication (KOKAI) No. 2004-251,868 discloses such an electric-waves transmittable cover member, for instance. The electric-waves transmittable cover member comprises a transparent resinous layer, a substrate layer, and a decorated layer. The transparent resinous layer is composed of an electric-waves transmittable and transparent material. The substrate layer is disposed on the rear side of the transparent resinous layer, and is composed of an electric-waves transmittable material. The decorated layer is disposed between the transparent resinous layer and the substrate layer.

The conventional electric-waves transmittable cover member is produced utilizing a so-called film in-mold method. For example, a film is shaped to a predetermined configuration. The film comprises a film substrate, and a printed membrane, which has a predetermined decoration and is formed on the film substrate. While disposing the shaped film within a forming mold, the transparent resinous layer is formed on the printed-membrane side of the film, and then the film substrate is removed. Thus, a first molded body is formed, and is provided with a transfer membrane to which the printed membrane is transferred. Thereafter, the substrate layer is formed on the transfer-membrane side of the first molded body. Alternatively, a film is shaped to a predetermined configuration. The film comprises a film substrate, and a printed membrane, which has a predetermined decoration and is formed on the film substrate, similarly. While disposing the shaped film within a forming mold, the transparent resinous layer is formed on the printed-membrane side of the film. Thus, a first molded body is formed. Thereafter, the substrate layer is formed on the film-substrate side of the first molded body.

Moreover, in the conventional electric-waves transmittable cover member, the transparent resinous layer and the substrate layer have the inner surfaces, which face to each other, and the inner surfaces are provided with a predetermined irregularity, respectively, and the printed membrane with a predetermined decoration is disposed on the convexity of the irregularity, which is provided for the inner surface of the substrate layer, in order to enhance the decorativeness of the conventional electric-waves transmittable cover member, which is appreciated visually from the transparent-resinous-layer side.

In addition, in the conventional electric-waves transmittable cover member, the substrate layer is disposed on the rear side of the transparent resinous layer to make a laminated construction, and thereby the irregularity of the substrate layer absorbs the thickness fluctuation of the transparent resinous layer, which results from providing the irregularity for the transparent resinous layer, so as to make the thickness over the entire conventional electric-waves transmittable cover member constant. Thus, the conventional electric-waves transmittable cover member avoids such a drawback that the electric-waves transmittability has fluctuated between the thicker portions and the thinner portions.

Note that such a conventional electric-waves transmittable cover member is fastened to and held by a front grill in the following manner. For example, an engaging portion, such as an engagement projection, which protrudes from the rear surface of the substrate layer, is engaged with an engaged portion, such as an engagement hole, which is provided for the front grill, and thereby fixing the conventional electric-waves transmittable cover member onto the front grill.

Meanwhile, when a front grill inclines with respect the vertical direction so as to bulge from small to large as it extends downward, an electric-waves transmittable cover member, which is disposed in the opening of the front grill, can desirably have a transparent resinous layer whose outer surface inclines as well so as to agree with the inclining front grill, from the viewpoint of upgrading the decorativeness by enhancing the integrity between the front grill and the electric-waves transmittable cover member. In this instance, when the outer surface of the transparent resinous layer is formed as such an inclining surface, the rear surface of the substrate layer can desirably be formed as a similarly inclining surface so that the thickness over the entire conventional electric-waves transmittable cover member is made constant in order to inhibit the fluctuation of electric-waves transmittability, which results from the changing thickness. Likewise, in order that the conventional electric-waves transmittable cover member satisfactorily demonstrates such a decorative effect that the decoration of the printed membrane comes up three-dimensionally within the transparent resinous layer, the transparent resinous layer can desirably have a constant thickness. If such is the case, the inner surfaces of the transparent resinous layer and substrate layer, which face to each other, are formed as a similarly inclining surface, respectively.

However, when trying to produce an electric-waves transmittable cover member which comprises such inclining surfaces, there arise problems as hereinafter described.

That is, when utilizing a film in-mold method, a film is shaped to a predetermined configuration in advance, and then a transparent resinous layer, for instance, is molded while disposing the shaped film in a forming mold. Thus, it is possible to form the transparent resinous layer integrally with the film. However, from the viewpoint of improving the productivity, it is desirable to shape a film so as to conform to the inner-surface configuration of a transparent resinous layer simultaneously with the molding of the transparent resinous layer. Moreover, when forming a substrate layer integrally with the thus produced primary molded product, which comprises the transparent resinous layer and the film, to produce a secondary molded product, the secondary molded product is usually removed from the forming mold in the same direction as the primary molded product is removed therefrom. For example, when a primary molded product is molded using a primary forming mold, in which a movable mold moves in the horizontal direction to open and close the primary forming mold, and the resulting primary molded product is removed from the primary forming mold in the horizontal direction, a secondary molded product is molded using a secondary forming mold, in which a movable mold moves likewise in the horizontal direction to open and close the secondary forming mold, and the resulting secondary molded product is removed from the secondary forming mold in the horizontal direction. In this instance, since the engaging portion extends in the horizontal direction, it does not make an undercut. Thus, the secondary molded product can be removed from the secondary forming mold without using any sliding mold.

In such a mode that the secondary molded product is removed from the secondary forming mold, without utilizing any sliding mold, in the same direction as the primary molded product is removed from the primary forming mold, when trying to shape a film, which is extended in the vertical direction, simultaneously with the molding of a transparent resinous layer provided with an inclining inner surface, the film, which is extended in the vertical direction, is pressed onto a molding surface for molding the inclining inner surface. Accordingly, the displacement magnitude (or elongation magnitude) of the shaped film changes depending on the inclination of the molding surface, and has come to differ from parts to the other parts of the shaped film. For example, when the molding cavity surface for molding the inclining molding surface inclines with respect to the film, which is extended in the vertical direction, so as to separate away more from the film as it goes upward, the displacement magnitude of the film is larger at the upper parts of the shaped film. Consequently, the upper parts of the shaped film suffer from such problems that decorative deviations have occurred, that is, the decorative printed membrane, which is provided for the film, has deviated from a specifically-designed position; that the film substrate have been torn apart; and that the printed membrane has been cracked. Moreover, when the molding cavity surface for molding the inclining surface is provided with an irregularity, the film substrate and printed membrane cannot follow up the irregular configuration fully at the upper parts of the shaped film, which exhibit larger displacement magnitudes, so that the torn-off film substrate and the cracked printed membrane are likely to occur. Note that, from the viewpoint of inhibiting the decorative deviations, if a material, which is less likely to elongate, is employed to make the film substrate, the film substrate is more likely to be torn off.

SUMMARY OF THE INVENTION

The present invention has been developed in view of the aforementioned circumstances. It is therefore an object of the present invention to provide a process for producing a resinous laminated member, process which can eliminate such problems as the decorative deviations, the torn-off film substrate and the cracked printed membrane, even when producing a resinous laminated member provided with inclining surfaces by means of a film in-mold method without utilizing any sliding mold.

A process according to the present invention for producing a resinous laminated member can achieve the aforementioned object. The present process is for producing a resinous laminated member, the resinous laminated member formed as a laminated structure, which comprises: a first resinous layer having a first inner surface; a second resinous layer disposed on the side of the first inner surface of the first resinous layer and having a second inner surface conforming to and at the same time facing to the first inner surface; and a decorated layer disposed between the first resinous layer and the second resinous layer so as to interpose between the first inner surface and the second inner surface; the second resinous layer further having an engaging portion extending in a predetermined oblique direction with respect to an extending direction of the first inner surface and the second inner surface, the process comprising the steps of:

a primary molding step of molding the first resinous layer and at the same time forming the first resinous layer integrally with the decorated layer while shaping the decorated layer in the first inner surface of the first resinous layer by means of a film in-mold method in which a film including a constituent element of the decorated layer in part thereof at least is disposed in a first forming mold and the first resinous layer is molded within the first forming mold, the first forming mold provided with a first-inner-surface molding cavity surface having a configuration corresponding to the first inner surface of the first resinous layer, thereby obtaining a primary molded product;

a secondary molding step of disposing the primary molded product in a second forming mold and molding the second resinous layer within the second forming mold to form the second resinous layer integrally with the primary molded product, thereby producing the resinous laminated member, wherein:

the primary molding step comprising the steps of:

a shaping step of shaping the film so as to conform to the first inner surface of the first resinous layer with the first-inner-surface molding cavity surface of the first forming mold, the film being extended in such a manner that the maximum elongation of the film decreases from large to small with respect to an extending direction of the first-inner-surface molding cavity surface when shaping the film while extending the film substantially parallelly to the predetermined oblique direction, in which the engaging portion of the second resinous layer extends in the produced resinous laminated member; and a primary removing step of removing the primary molded product from the first forming mold in a substantially perpendicular direction with respect to the extending direction of the first inner surface of the resulting first resinous layer; and the secondary molding step comprising the steps of:

a secondary disposing step of disposing the primary molded product in the second forming mold so that the first inner surface of the first resinous layer making the primary molded product extends substantially parallelly to the predetermined oblique direction, in which the engaging portion of the second resinous layer extends in the produced resinous laminated member, with respect to an extending direction, in which the resultant engaging portion of the second resinous layer extends in the second forming mold; and a secondary removing step of removing the resinous laminated member from the second forming mold parallelly with respect to the extending direction, in which the resultant engaging portion of the second resinous layer extends in the second forming mold.

The term, "decorated layer," means a layer, which is formed integrally on the first inner surface of the first resinous layer. For example, the decorated layer can be a layer, which comprises a film substrate, and a decorative layer, for instance, a printed layer or a metallic deposition layer, formed on the film substrate. Alternatively, the decorated layer can be a layer, which comprises a film substrate, and a functional layer having a specific function, for instance, an electric conductive property, and formed on the film substrate. Moreover, the decorated layer can be a transfer layer in which such a decorative layer or functional layer is transferred from a film substrate to the first inner surface of the first resinous layer.

The phrase, "the film being extended in such a manner that the maximum elongation of the film decreases from large to small with respect to an extending direction of the first-inner-surface molding cavity surface when shaping the film while extending the film substantially parallelly to the predetermined oblique direction, in which the engaging portion of the second resinous layer extends in the produced resinous laminated member," means that the film is extended in such a manner that the film is extended substantially parallelly to the predetermined oblique direction, in which the engaging portion of the second resinous layer extends in the produced resinous laminated member, and the inclination angle of the thus extend film decreases from large to small with respect to an extending direction of the first-inner-surface molding surface.

In the present process, a resinous laminated member is produced utilizing a film in-mold method. The resinous laminated member is formed as a laminated structure. The laminated structure comprises a first resinous layer, a second resinous layer, a decorated layer, which is disposed between the first resinous layer and the second resinous layer. The first resinous layer has a first inner surface. The second resinous layer has a second inner surface, which faces to the first inner surface of the first resinous layer. Moreover, the first inner surface and second inner surface, which face to each other, are disposed in an inclined manner, respectively. In addition, the second resinous layer further has an engaging portion, which extends in a predetermined oblique direction with respect to an extending direction of the first inner surface and the second inner surface.

The present process comprises a primary molding step. In the primary molding step, a first molded product is obtained. Specifically, the first resinous layer is molded, and at the same time the first resinous layer is formed integrally with the decorated layer while shaping the decorated layer in the first inner surface of the first resinous layer by means of a film in-mold method. In the film in-mold method, a film, which includes a constituent element of the decorated layer in part thereof at least, is disposed in a first forming mold, and the first resinous layer is molded within the first forming mold. Note that the first forming mold is provided with a first-inner-surface molding cavity surface, which has a configuration corresponding to the first inner surface of the first resinous layer.

The primary molding step of the present process comprises a shaping step, and a primary removing step. In the shaping step, the film is shaped so as to conform to the first inner surface of the first resinous layer with the first-inner-surface molding cavity surface of the first forming mold. In this instance, note that the film is extended in such a manner that the maximum elongation of the film decreases from large to small with respect to an extending direction of the first-inner-surface molding cavity surface when shaping the film while extending the film substantially parallelly to the predetermined oblique direction, in which the engaging portion of the second resinous layer extends in the produced resinous laminated member. When the film is thus extended so that the maximum elongation of the film decreases from large to small with respect to an extending direction of the first-inner-surface molding cavity surface, it is possible to make the elongation of the shaped film, that is, the deformation magnitude of the shaped film which is equivalent to the distance between the film and the first-inner-surface molding cavity surface of the first forming mold, smaller. Accordingly, even when the inclined inner surface of the first resinous layer is molded by shaping the film, which is extended in such a manner that the maximum value of the film's elongation resulting from the shaping decreases from large to small, with the first-inner-surface molding cavity surface of the first forming mold, it is possible to make the maximum value of the film's elongation or deformation magnitude smaller. Consequently, it becomes possible to inhibit the decorative deviations and torn-off film substrate, which result from the film moving greatly. Moreover, in the primary removing step of the primary molding step, note that the primary molded product is removed from the first forming mold in a substantially perpendicular direction with respect to the extending direction of the first inner surface of the resulting first resinous layer, that is, the extending direction of the first-inner-surface molding cavity surface of the first forming mold.

In the secondary molding step of the present process, the primary molded product is disposed in a second forming mold, and the second resinous layer is molded within the second forming mold to form the second resinous layer integrally with the primary molded product. Thus, the resinous laminated member is produced. The secondary molding step comprises a secondary disposing step, and a secondary removing step. In the secondary disposing step of the secondary molding step, the primary molded product is disposed in the second forming mold. In this instance, note that the first inner surface of the first resinous layer making the primary molded product is disposed so as to extend substantially parallelly to the predetermined oblique direction, in which the engaging portion of the second resinous layer extends in the produced resinous laminated member, with respect to an extending direction, in which the resultant engaging portion of the second resinous layer extends in the second forming mold. Then, in the secondary removing step of the secondary molding step, the resinous laminated member is removed from the second forming mold parallelly with respect to the extending direction, in which the resultant engaging portion of the second resinous layer extends in the second forming mold. Since the resinous laminated member can be removed from the second forming mold parallelly with respect to the extending direction of the resultant engaging portion within the second forming mold, it is not required at all to utilize any sliding mold in order to avoid undercut.

Therefore, the present production process makes it possible to solve the problems, such as the decorative deviations, the torn-off film substrate and the cracked printed membrane, even when producing a resinous laminated member provided with inclining surfaces by means of an film in-mold method without utilizing any sliding mold.

In a preferable mode of the present production process, the first inner surface comprises a first irregular inner surface having a first irregularity; the second inner surface comprises a second irregular inner surface having a second irregularity, which conforms to the first irregularity of the first irregular inner surface in the first inner surface; and the first-inner-surface molding cavity surface of the first forming mold comprises a molding cavity surface for molding the first irregular inner surface.

In the preferable mode of the present production process, the first inner surface of the first resinous layer and the second inner surface of the second resinous layer comprise a first irregular inner surface and a second irregular inner surface, which conform to each other, respectively. Moreover, the first-inner-surface molding cavity surface of the first forming mold comprises a first-irregular-inner-surface molding cavity surface for molding the first irregular inner surface. Note, however, that the preferable mode might suffer from a problem that the film is torn off at the edges of the irregular configuration because the film cannot follow up the irregular configuration of the first-irregular-inner-surface molding cavity surface of the first forming mold fully when shaping the film. In particular, when the height and/or depth of the irregular configuration is too large, it is presumable that the problem resulting from the torn-off film substrate might occur noticeably. However, in accordance with the present production process, it is possible to minimize the elongation of the film when shaping the film, as described above. Consequently, even when shaping the film with the first-irregular-inner-surface molding cavity surface of the first forming mold, it is possible to get rid of such a problem as from the torn-off film substrate.

In a further preferable mode of the present production process, the film, which is disposed to extend substantially parallelly with respect to the extending direction of the first-inner-surface molding cavity surface of the first forming mold, is shaped with the first-inner-surface molding cavity surface in the shaping step of the primary molding step.

Here, the phrase, "being disposed to extend substantially parallelly with respect to the extending direction of the first-inner-surface molding cavity surface of the first forming mold," means to include not only such an arrangement that, when the first-inner-surface molding cavity surface comprises a flat surface, the film is disposed to extend parallelly with respect to the flat surface, but also such another arrangement that, when the first-inner-surface molding cavity surface comprises a first-irregular-inner-surface molding cavity surface, which is provided with a first irregularity, and a datum surface other than the first irregularity, which comprises a flat surface, the film is disposed to extend parallelly with respect to the flat surface making the datum surface.

In the further preferable mode of the present production process, the film, which is disposed to extend substantially parallelly with respect to the extending direction of the first-inner-surface molding cavity surface of the first forming mold having a configuration conforming to the first inner surface of the first resinous layer, is shaped with the first-inner-layer-surface molding cavity surface so as to conform to the first inner surface. When the film is thus disposed to extend substantially parallelly with respect to the extending direction of the first-inner-surface molding cavity surface, it is possible to make the elongation of the shaped film, that is, the deformation magnitude of the shaped film which is equivalent to the distance between the film and the first-inner-surface molding cavity surface substantially constant over the entire thus disposed film. Accordingly, it is possible to place the film at a proximity position, or as close as possible, with respect to the first-inner-surface molding cavity surface. Consequently, it is possible to make the deformation magnitude of the shaped film, that is, the elongation of the shaped film, much smaller with ease.

In a furthermore preferable mode of the present production process, the film, which is disposed to extend so that approximate magnitudes, which are found by a least-squares method for estimating the elongation of the film resulting from the shaping, are minimized, is shaped with the first-inner-surface molding cavity surface in the shaping step of the primary molding step.

In the furthermore preferable mode of the present production process, the film, which is disposed to extend so that approximated magnitudes, which are found by a least-squares method for estimating the elongation of the film resulting from the shaping, are minimized, is shaped with the first-inner-surface molding cavity surface in the shaping step of the primary molding step. Accordingly, even when the first-inner-surface molding cavity surface comprises a curved surface, it is possible to make the elongation of the shaped film, that is, the deformation magnitude of the shaped film which is equivalent to the distance between the disposed film and the first-inner-surface molding cavity surface, not only substantially constant but also much smaller over the entire thus disposed film.

In a moreover preferable mode of the present production process, the film comprises a film substrate, and the constituent element of the decorated layer formed on the film substrate; and the constituent element is transferred onto the first inner surface of the first resinous layer in the primary molding step, thereby forming the decorative layer integrally on the first inner surface.

In the moreover preferable mode of the present production process, the decorative layer is formed on the first inner surface of the first resinous layer by means of transfer. Accordingly, no film substrate remains between the first resinous layer and the second resinous layer. Consequently, it is possible to avoid such a drawback that the remaining film substrate has changed or degraded the characteristics of the resulting resinous laminated member.

In another preferable mode of the present production process, the first resinous layer is composed of a transparent resin; and the decorated layer comprises a decorative layer, which is disposed in one of dents of the first irregular inner surface of the first inner surface in the first resinous layer.

In the another preferable mode of the present production process, a decorative layer having a specific decoration, for instance, is formed as the decorated layer in one of dents of the first irregular inner surface of the first inner surface in the first resinous layer, that is, on one of convexities of the second irregular inner surface of the second inner surface in the second resinous layer, and the first resinous layer is composed of a transparent resin. As a result, it is possible to produce a resinous laminated member exhibiting enhanced decorativeness, which is viewable through the resultant transparent resinous layer, the first resinous layer.

In a still another preferable mode of the present production process, the first resinous layer further has a first outer surface, which inclines substantially parallelly to the first inner surface; and the resinous laminated member makes an electric-waves transmittable cover member. Moreover, the resinous laminated member can further preferably make an electric-waves transmittable cover member, which has a substantially uniform thickness. In accordance with the still another preferable mode, it is possible to make the first outer layer of the first resinous layer (or the outermost surface of a transparent resinous layer when the first resinous layer comprises the transparent resinous layer) into a predetermined inclining surface. As result, it is possible to produce an electric-waves transmittable cover member, which exhibits an upgraded degree of decorative freedom in terms of three-dimensional decoration.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Hereinafter, specific examples according to the present process for producing a resinous laminated member will be described with reference to the drawings. The following specific examples are applications of the present invention to the production of an electric-waves transmittable cover member, a resinous laminated member. The resulting electric-waves transmittable cover member can be used suitably for a front garnish. Note that the resultant front garnish is disposed in an opening, which is formed in a front grill, an exterior component part for vehicles. Moreover, as described above, an on-vehicle radar device, which utilizes extremely-high-frequency waves, for instance, is disposed in the rear of the front grill.

Example No. 1

Figure 1:
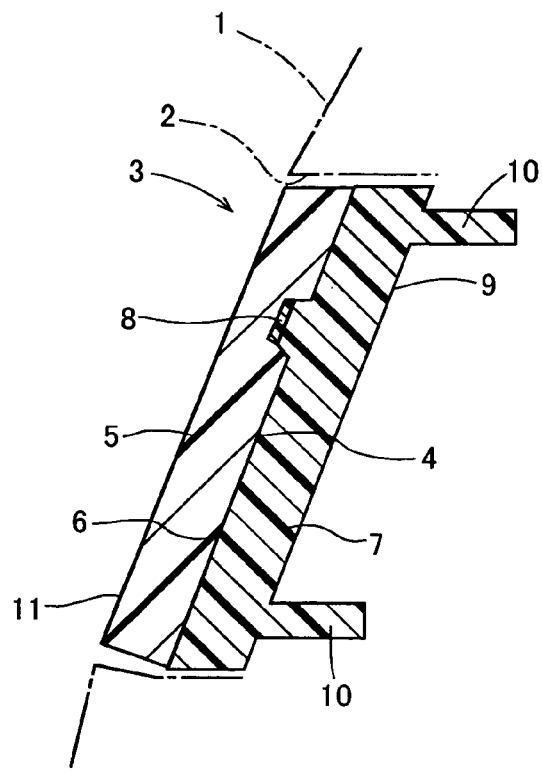
FIG. 1 relates to Example No. 1 of the present invention, and is a cross-sectional view for illustrating an electric-waves transmittable cover member, a resinous laminated member, which is installed to a front grill, in a simplified manner.

An electric-waves transmittable cover member 1, a resinous laminated member according to Example No. 1 of the present invention, can transmit electric waves, such as extremely-high-frequency waves, therethrough. As shown in FIG. 1, a cross-sectional view of the electric-waves transmittable cover member 1, the electric-waves transmittable cover member 1 is formed as a laminated structure, which comprises a transparent resinous member 5, the claimed first resinous layer; a substrate layer 7, the claimed second resinous layer; and a decorative layer 8, the claimed decorated layer, disposed between the transparent resinous layer 5 and the substrate layer 7. Specifically, when the electric-waves transmittable cover member 1 is disposed in an opening 2 of a front grill 1, the transparent resinous layer 5 is disposed on the outermost side, that is, on the left side in FIG. 1 (or on the front side of an automobile), and has a first irregular inner surface 4 having a first irregularity, the claimed first inner surface. The substrate layer 7 is disposed on the transparent resinous layer 5's first irregular inner surface 4, and has a second irregular inner surface 6, the claimed second inner surface, which faces to the first irregular inner surface 4. Note that the second irregular inner surface 6 is provided with a second irregularity, which conforms to the first irregularity of the first irregular inner surface 4. The decorative layer 8 is disposed so as to interpose between the first irregular inner surface 4 and the second irregular inner surface 6. Note that it is possible to control the height and/or depth of the first and second irregularities so as to fall in a range of from 1.0 to 3.0 mm approximately. In Example No. 1 of the present invention, the first and second irregularities had a height and/or depth of 1.2 mm.

The transparent resinous layer 5 is composed of polycarbonate (or PC), a transparent electric-waves transmittable material, that is, a material for dielectric substance. The substrate layer 7 is composed of acrylonitrile-ethylene propylene-styrene co-polymer (or AES), another transparent electric-waves transmittable material, that is, another material for dielectric substance. The substrate layer 7 is provided with engagement projections 10, 10, the claimed engaging portion, on the rear surface 9, that is, on a second outer surface. Note that the respective engagement projections 10, 10 can engage with engagement holes (not shown), engaged portions, which are formed in the front grill 1, an engaged member. Moreover, as shown in FIG. 1, the engagement projections 10, 10 extend in the horizontal direction when the electric-waves transmittable cover member 1 is disposed in the opening 2 of the front grill 1. The decorative layer 8 comprises a printed membrane. As described later, the decorative layer 8 is formed in and integrally with the dent of the transparent resinous layer 5's first irregular inner surface 4 by means of transfer, which utilizes a film in-mold method, in a later-described primary molding step.

Moreover, the front grill 1 inclines at a comparatively large predetermined angle (e.g., at 35 degrees or more approximately) with respect to the vertical direction so that it bulges from small to large toward the front side of an automobile as it goes downward. Accordingly, from the viewpoint of enhancing the integrity between the front grill 1 and the electric-waves transmittable cover member 3 to upgrade the decorativeness, the transparent resinous layer 5's outermost surface 11, the claimed first outer surface, inclines as well at a predetermined angle so that it agrees with the inclining front grill 1 in the electric-waves transmittable cover member 3 according to Example No. 1 of the present invention. Moreover, the electric-waves transmittable cover member 3 is designed to have a constant thickness as a whole in order to inhibit the fluctuation of the electric-waves transmittability, which results from the varying thickness. In addition, the substrate layer 7's rear surface 9 is likewise an inclining surface, which inclines similarly to the transparent resinous layer 5's outermost surface 11. Specifically, the electric-waves transmittable cover member 3 has a constant thickness as a whole, because the transparent resinous layer 5 and the substrate layer 7 have a constant thickness, respectively. Moreover, in addition thereto, the transparent resinous layer 5's outermost surface 11, the transparent resinous layer 5's first irregular inner surface 4, the substrate layer 7's second irregular inner surface 6, and the substrate layer 7's rear surface 9 are inclining surfaces, which incline at the predetermined identical angle, respectively, with respect to the vertical direction.

The thus constructed electric-waves transmittable cover member 3 according to Example No. 1 of the present invention was produced in the following manner utilizing a film in-mold method.

Primary Molding Step

Figure 2:
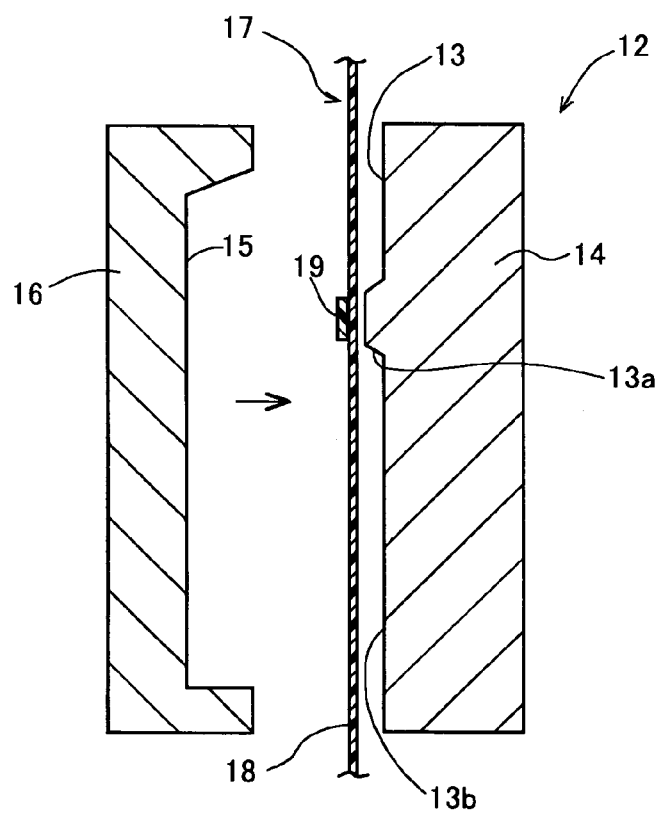
FIG. 2 relates to Example No. 1 of the present invention, and is a cross-sectional view for illustrating a film, which is disposed parallelly with respect to a first-irregular-inner-surface molding cavity surface of a first stationary mold in a primary molding step.

In a primary molding step according to Example No. 1 of the present invention, a first forming mold 12 was used. As shown in FIG. 2, the first forming mold 12 comprised a first stationary mold 14, and a first movable mold 16. The first stationary mold 14 was provided with a first-irregular-inner-surface molding cavity surface 13 for molding the transparent resinous 5's first irregular inner surface 4 and at the same time for shaping a later-described film to a predetermined configuration. The first movable mold 16 was disposed reciprocally in the horizontal direction with respect to the first stationary mold 14, and was provided with a first-outer-surface molding cavity surface 15 for molding the outermost surface 11 or the claimed first outer surface. When the first stationary mold 14 and the first movable mold 16 were closed to close the first forming mold 12, a primary cavity was formed in the first forming mold 12. Note that the resulting primary cavity corresponded to the outer configuration of the transparent resinous layer 5 substantially. Specifically, the resultant primary cavity had a larger thickness than the thickness of the transparent resinous layer 5 by the thickness of a later-described film substrate 18 in the closing direction of the first forming mold 12. Moreover, the first stationary mold 14's first-irregular-inner-surface molding cavity surface 13 and the first movable mold 16's first-outer-surface molding cavity surface 15 were disposed parallelly to each other, and extended in the vertical direction.

In addition, in the primary molding step according to Example No. 1 of the present invention, a film 17 was used. The film 17 comprised a film substrate 18, and a printed membrane 19, the claimed constituent element of the decorative layer 8 (that is, the claimed decorated layer). The film substrate 18 was composed of resin which exhibited a certain extent of elongatability, such as polyethylene terephthalate (or PET), polyvinyl chloride (or PVC), polymethylmetacrylate (or PMMA) and polypropylene (or PP), and had a thickness of from 20 to 200 µm approximately. The printed membrane 19 was disposed at a predetermined position on the film substrate 18, and was formed integrally with the film substrate 18. Note that the film 17 can further comprise an adhesive layer, which is disposed between the film substrate 18 and the printed membrane 19, or which is disposed on one of the opposite outermost sides of the film substrate 18 and the printed membrane 19, or on both of them.

In the primary molding step according to Example No. 1 of the present invention, the first movable mold 16 was first retracted with respect to the first stationary mold 14 to open the first forming mold 12. In the thus opened first forming mold 12, the film 17 was extended in the vertical direction at a predetermined position, which was disposed adjacent to the first-irregular-inner-surface molding cavity surface 13 of the first stationary mold 14, as shown in FIG. 2. In this instance, note that the film 17 was disposed so that one of the opposite surfaces of the film 17, that is, the opposite surface of the film 17 with the printed membrane 19 was provided, faced to the first movable mold 16. Specifically, the film 17 was extended parallelly with respect to the extending direction of the first stationary mold 14's first-irregular-inner-surface molding cavity surface 13. In other words, the film 17 was disposed so as to swing imaginarily with respect to the engagement projections 10, 10 in such a counterclockwise direction that can imaginarily cancel the clockwise oblique extending direction of engagement projections 10, 10 in the produced electric-waves transmittable cover member 3. Note that the film 17 was fed using film feeding rollers (not shown), and was taken up using film winding rollers (not shown). Moreover, the film 17 was positioned by a positioning detector (not shown) in the height-wise direction of the first forming mold 12, that is, in the vertical direction in the drawing.

More specifically, the first-irregular-inner-surface molding cavity surface 13 of the first stationary mold 14 comprised a convexed portion 13a, and datum surfaces 13b, as shown in FIG. 2. Note that the flat surfaces of the first-irregular-inner-surface molding cavity surface 13 excepting the convexed portion 13a made the datum surfaces 13b. To put it differently, the film 17 was extended parallelly with respect to the extending direction of the first-irregular-inner-surface molding cavity surface 13's datum surfaces 13b.

Shaping Step of Primary Molding Step

Figure 3:
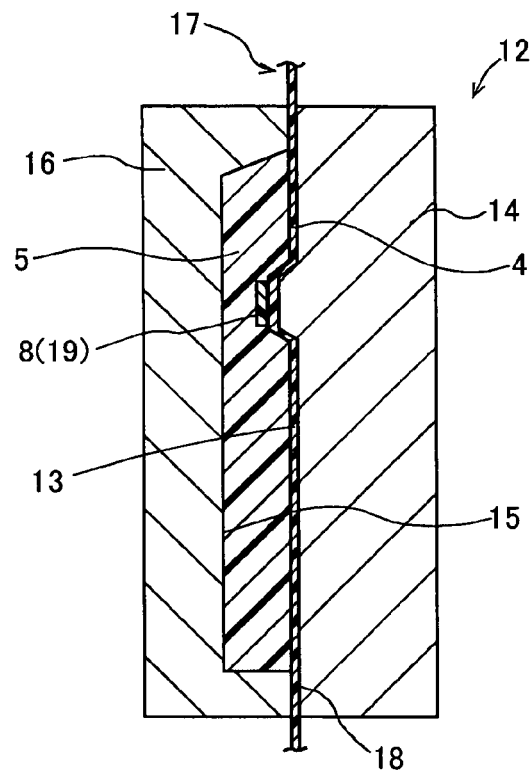
FIG. 3 relates to Example No. 1 of the present invention, and is a cross-sectional view for illustrating a transparent resinous layer, which is molded in the primary molding step, and the film, which is shaped simultaneously with the molding of the transparent resinous layer in the primary molding step.

Moreover, the first movable mold 16 was advanced with respect to the first stationary mold 14 in the horizontal direction to close the first forming mold 12. Thus, the primary cavity was formed as described above. Then, a predetermined molten resinous material was injected into the first forming mold 12, and was filled in the space between the first movable mold 16's first-outer-surface molding cavity surface 15 and the film 17 within the primary cavity. Accordingly, the transparent resinous layer 5 was molded, and at the same time the film 17 was shaped to a configuration, which conformed to the first irregular inner surface 4 of the resulting transparent resinous layer 5, with the resultant transparent resinous layer 5's first irregular inner surface 4 and the first stationary mold 14's first-irregular-inner-surface molding cavity surface 13. Consequently, the first irregular inner surface 4 of the transparent resinous layer 5 was provided integrally with the film 17, as shown in FIG. 3.

Primary Removing Step of Primary Molding Step

Figure 4:
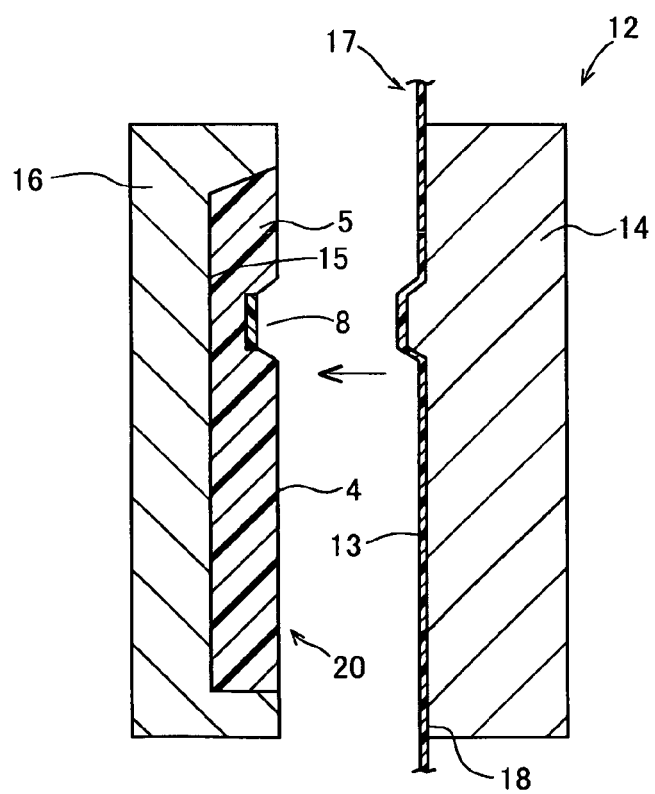
FIG. 4 relates to Example No. 1 of the present invention, and is a cross-sectional view for illustrating a first movable mold, which is opened with respect to the first stationary mold in the primary molding step.

Thereafter, the first movable mold 16 was retracted with respect to the first stationary mold 14 in the horizontal direction to open the first forming mold 12, as shown in FIG. 4. Then, a primary molded product 20 was removed from the first movable mold 16 of the first forming mold 12. The primary molded product 20 comprised the transparent resinous layer 5, and the decorative layer 8, which was formed in the dent of the transparent resinous layer 5's first irregular inner surface 4. In this instance, note that the resulting primary molded product 20 was retracted together with the first movable mold 16 while the film substrate 18 of the film 17 was peeled off from the first irregular inner surface 4 of the transparent resinous layer 5 so that the peeled-off film substrate 18 remained on the first stationary mold 14. Thus, the primary molded product 20 was eventually removed from the first movable mold 16 of the first forming mold 12 in this manner. Note that the primary molded product 20 was removed from the first movable mold 16 of the first forming mold 12 in the horizontal direction in the drawing, that is, perpendicularly with respect to the vertical direction in which the transparent resinous layer 5's first irregular inner surface 4 extended in the first movable mold 16.

Secondary Molding Step

Figure 5:
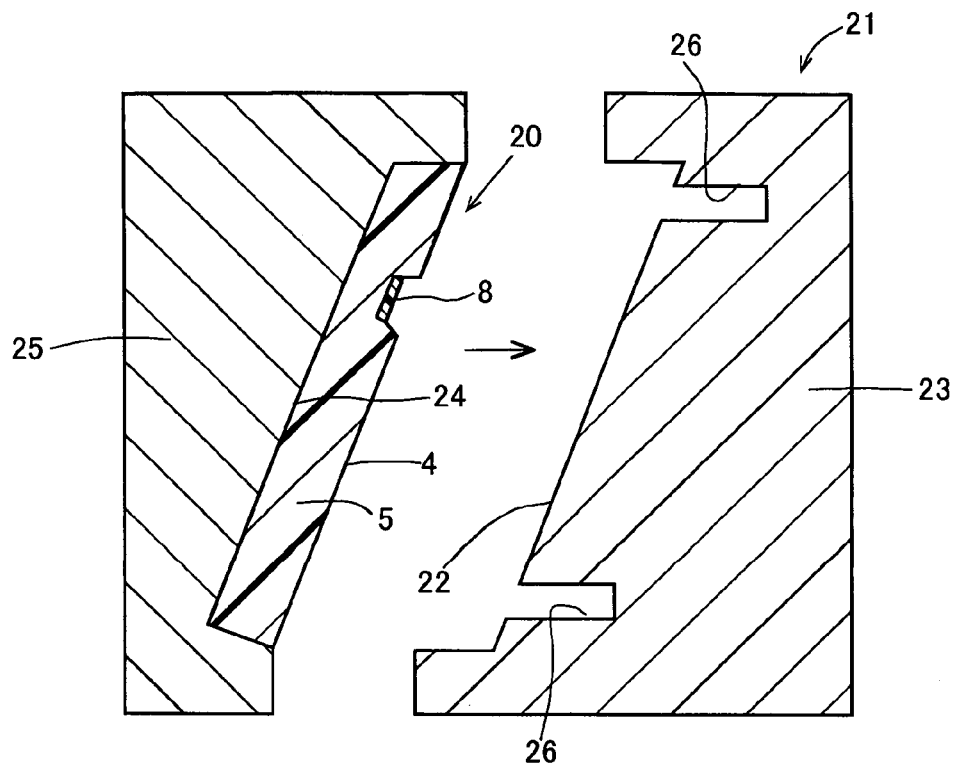
FIG. 5 relates to Example No. 1 of the present invention, and is a cross-sectional view for illustrating a primary molded product, which is disposed in a second movable mold in a secondary molding step.

In a secondary molding step according to Example No. 1 of the present invention, a second forming mold 21 was used. As shown in FIG. 5, the second forming mold 21 comprised a second stationary mold 23, and a second movable mold 25. The second stationary mold 23 was provided with a second-outer-surface molding cavity surface 22 for molding the rear surface 9 of the substrate layer 7, the second outer surface. The second movable mold 25 was disposed reciprocally in the horizontal direction with respect to the second stationary mold 23, and was provided with a cavity 24 in which the transparent resinous layer 5 of the primary molded product 20 was held or accommodated. Moreover, the second-outer-surface molding cavity surface 22 of the second stationary mold 23 had bores 26, 26 for providing the primary molded product 20 with the engagement projections 10, 10. When the second stationary mold 23 and the second movable mold 25, which held or accommodated the primary molded product 20 in the cavity 24, were closed to close the second forming mold 21, a secondary cavity was formed between the second stationary mold 23's second-outer-surface molding cavity surface 22 and the primary molded product 20. Note that the resulting secondary cavity corresponded to the outer configuration of the substrate layer 7 substantially. Also note that the second stationary mold 23's second-outer-surface molding cavity surface 22 and the second movable mold 25's cavity 24 were disposed parallelly to each other, and were extended in such a manner that they incline at the predetermined identical angle with respect to the vertical direction.

Secondary Disposing Step of Secondary Molding Step

In a secondary disposing step of the secondary molding step according to Example No. 1 of the present invention, the primary molded product 20 was held or accommodated in the cavity 24 of the second movable mold 25. Specifically, as shown in FIG. 5, the primary molded product 20 was disposed in the second movable mold 25 so that the first irregular inner surface 4 of the transparent resinous layer 5, making the primary molded product 20, extended in such a manner that it inclined at the predetermined angle with respect to the extending direction of the engagement projections 10, 10, which were provided for the substrate layer 7 in the produced electric-waves transmittable cover member 3. In other words, the transparent resinous layer 5 of the primary molded product 20 was held or accommodated in the cavity 24 in such a clockwise inclining manner that it was disposed parallelly to the clockwise oblique extending direction of the produced electric-waves transmittable cover member 3.

Figure 6:
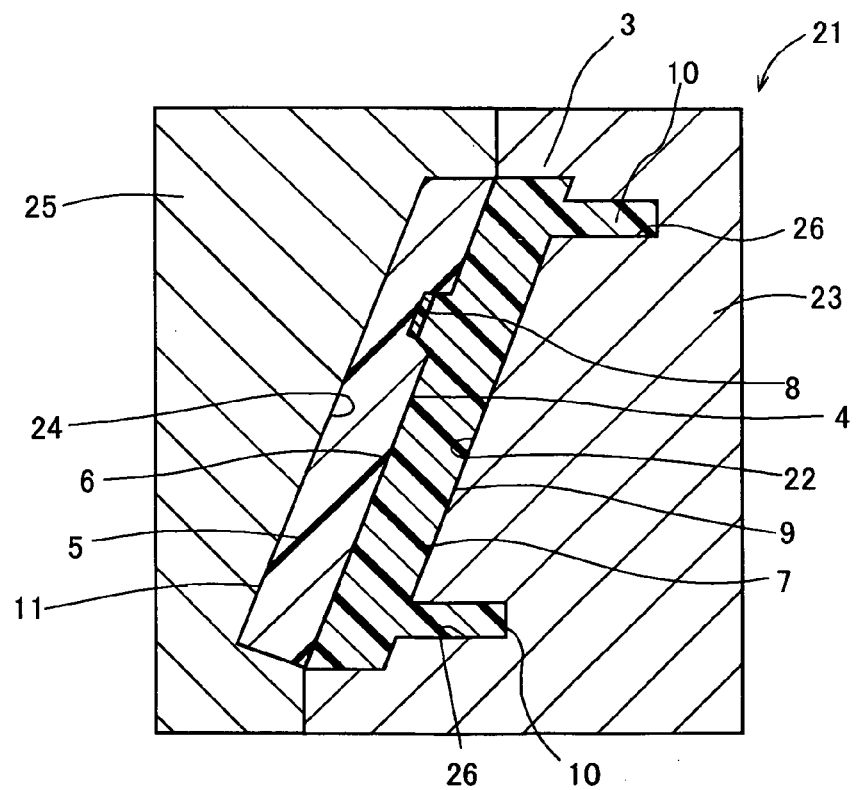
FIG. 6 relates to Example No. 1 of the present invention, and is a cross-sectional view for illustrating a substrate layer, which is formed integrally with the primary molded product in the secondary molding step.

Moreover, the second movable mold 25, in which the primary molded product 20 was disposed as described above, was advanced with respect to the second stationary mold 23 in the horizontal direction to close the second forming mold 21. Thus, the secondary cavity was formed as described above. Then, a predetermined molten resinous material was injected into the second forming mold 21, and was filled in the secondary cavity. Hence, the substrate layer 7 was formed integrally with the primary molded product 20 to complete the electric-waves transmittable cover member 3, a resinous laminated member, as shown in FIG. 6.

Secondary Removing Step of Secondary Molding Step

Figure 7:
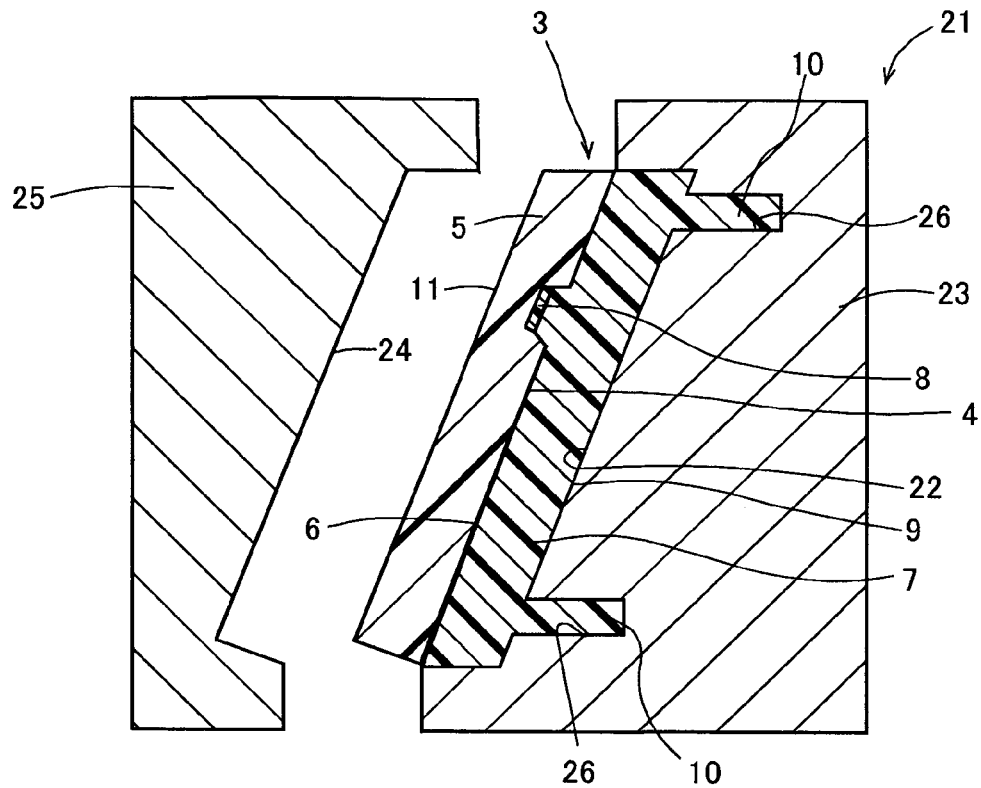
FIG. 7 relates to Example No. 1 of the present invention, and is a cross-sectional view for illustrating the second movable mold, which is opened with respect to a second stationary mold in the secondary molding step.

Thereafter, the second movable mold 25 was retracted with respect to the second stationary mold 23 in the horizontal direction to open the second forming mold 21, as shown in FIG. 7. Then, the resulting electric-waves transmittable cover member 3 was removed from the second stationary mold 23 of the second forming mold 21 in the horizontal direction, that is, parallelly with respect to the extending direction of the engagement projections 10, 10, which were disposed in the second stationary mold 23. Thus, the electric-waves transmittable cover member 3 according to Example No. 1 of the present invention was produced eventually.

In accordance with the production process according to Example No. 1 of the present invention, the film 17, which was extended parallelly with respect to the extending direction of the first stationary mold 14's first-irregular-innersurface molding cavity surface 13, was shaped by the first-irregular-inner-surface molding cavity surface 13 in the primary molding step. Accordingly, even when molding the first irregular inner surface 4 of the transparent resinous layer 5, which was to be disposed in an inclining manner with respect to the front grill 1, it was possible to make the elongation (or deformation magnitude) of the shaped film 17 substantially uniform as a whole as well as to minimize it. Consequently, it was possible to inhibit the decorative deviations, torn-off film substrate and cracked printed membrane, which resulted from the greatly moving film 17, from occurring.

Moreover, in the secondary molding step of the production process according to Example No. 1 of the present invention, it was possible to remove the produced electric-waves transmittable cover member 3 from the second stationary mold 23 parallelly with respect to the extending direction of the engagement projections 10, 10. Therefore, the production process according to Example No. 1 did not necessitate at all utilizing any sliding mold in order to avoid undercut.

Thus, even when producing the electric-waves transmittable cover member 3, which was provided with the inclining surfaces, by means of a film in-mold method without utilizing any sliding mold at all, the production process according to Example No. 1 of the present invention could solve the problems, such as the decorative deviations, torn-off film substrate and cracked printed membrane.

In the production process according to Example No. 1 of the present invention, note that the first irregular inner surface 4 of the transparent resinous layer 5 and the second irregular inner surface 6 of the substrate layer 7 were formed as irregular configurations, which conformed to each other, respectively. Accordingly, the elongated film 17 might not have followed up the irregular configurations completely. Consequently, there might have arisen a problem that the film 17 was likely to be torn off by the edges of the irregular configurations. However, in the shaping step of the primary molding step of the production process according to Example No. 1, the elongation of the film 17 could be kept less during the shaping as described above. Therefore, even when the film 17 was shaped with the first-irregular-inner-surface molding cavity surface 13 of the first stationary mold 14, it was possible to inhibit the occurrence of such a problem as torn-off film 17.

Moreover, in the production process according to Example No. 1 of the present invention, the decorative layer 8 was formed onto the first irregular inner surface 4 of the transparent resinous layer 5 by means of transfer. Accordingly, no film substrate 18 remained between the transparent resinous layer 5 and the substrate layer 7. Consequently, it was possible to avoid such a drawback that the remained film substrate 18 adversely affected the electric-waves transmittability of the resulting electric-waves transmittable cover member 3.

In addition, in the production process according to Example No. 1 of the present invention, the decorative layer 8 was formed in the dent within the transparent resinous layer 5's first irregular inner surface 4, or on the convexity within the substrate layer 7's second irregular inner surface 6. Therefore, such a construction enhanced the three-dimensional effect of the decorative layer 8, which was viewable through the transparent resinous layer 5, so that the decorativeness of the electric-waves transmittable cover member 3 was upgraded as a whole.

Thus, in accordance with the production process according to Example No. 1 of the present invention, it was possible to make the outermost surface 11 of the transparent resinous layer 5, that is, the claimed first outer surface, into a predetermined inclining surface. Hence, the production process according to Example No. 1 enabled automobile part manufacturers, for instance, to produce the electric-waves transmittable cover member 3, which offered three-dimensional decoration provided with an upgraded degree of decorative freedom.

Example No. 2

In a production process according to Example No. 2 of the present invention, the electric-waves transmittable cover member 3 according to Example No. 1 was produced similarly while making a modification to it. Specifically, the electric-waves transmittable cover member 3 produced in accordance with Example No. 2 comprised a laminated structure, which was changed configurationally from that of the electric-waves transmittable cover member 3 produced in accordance with Example No. 1.

Figure 8:
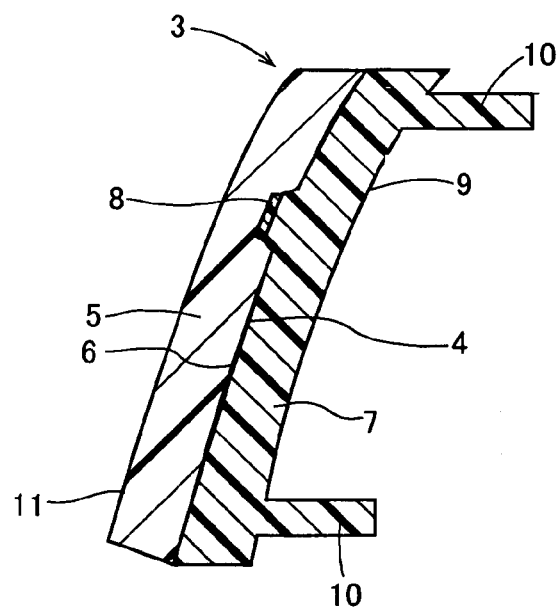
FIG. 8 relates to Example No. 2 of the present invention, and is a cross-sectional view for illustrating an electric-waves transmittable cover member, a resinous laminated member.

For example, as illustrated in FIG. 8, the transparent resinous layer 5's outermost surface 11, the claimed first outer layer, and the transparent resinous layer 5's first irregular inner surface 4 were formed as gently curved surfaces, respectively. Similarly, the substrate layer 7's rear surface 9, the second outer surface, and the substrate layer 7's second irregular inner surface 6 were formed as gently curved surfaces, respectively. Likewise, the first stationary mold 12's first-irregular-inner-surface molding cavity surface 13, and the second stationary mold 23's second-irregular-outer-surface molding cavity surface 22 were formed as gently curved surfaces, respectively. Moreover, the resulting gently curved surfaces were convexed surfaces, respectively, which bulged from small to large toward the forward side of a vehicle. In addition, the curved first irregular inner surface 4 and the curved second irregular inner surface 6 conformed to each other.

Figure 9:
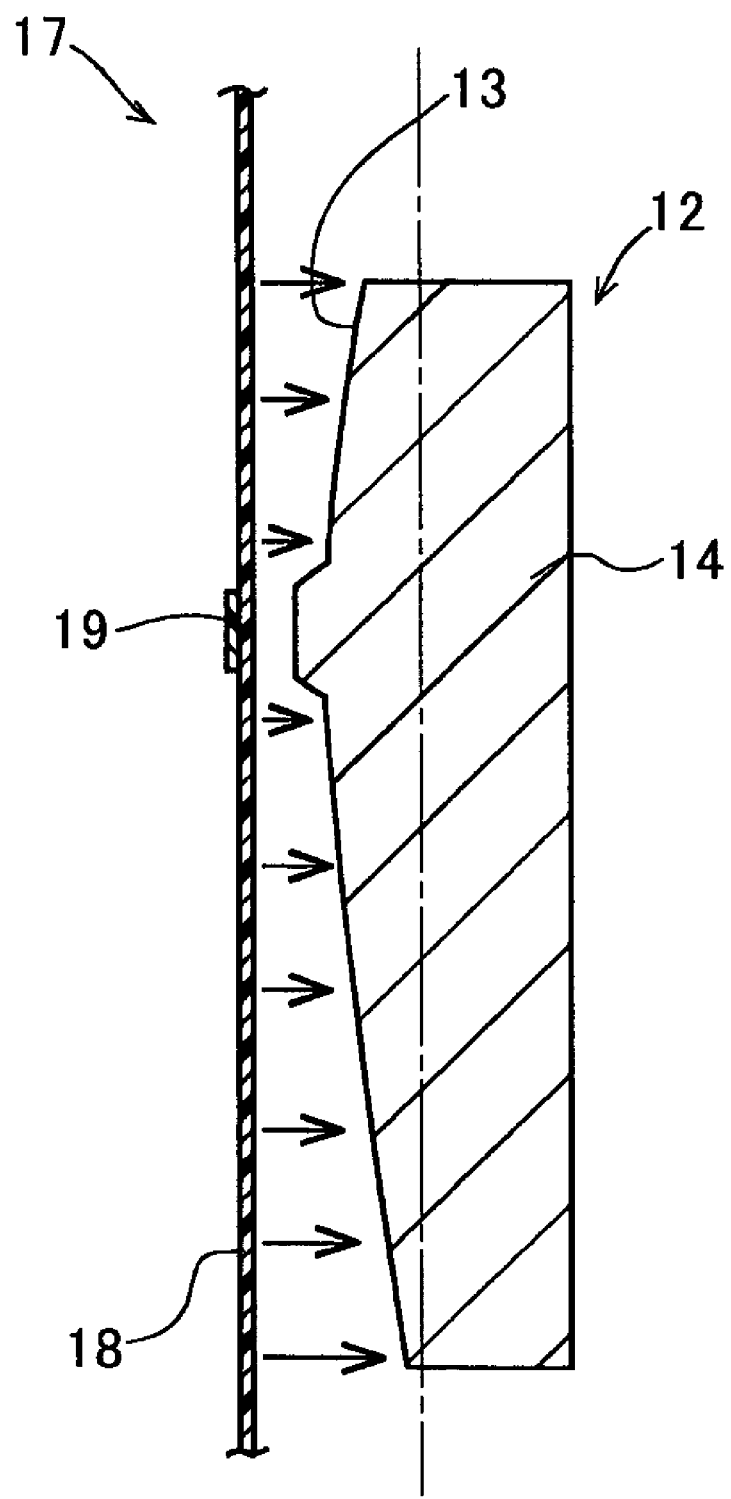
FIG. 9 relates to Example No. 2 of the present invention, and is a cross-sectional view for illustrating a film, which is disposed parallelly with respect to a first-irregular-inner-surface molding cavity surface of a first stationary mold in a primary molding step.

When producing the thus constructed electric-waves transmittable cover member 3 in accordance with the production process according to Example No. 2 of the present invention, the film 17 was extended parallelly with respect to the extending direction of the first stationary mold 12's first-irregular-inner-surface molding cavity surface 13 in the shaping step of the primary molding step so that approximated values, which were found by means of a least-squares method for estimating the elongation of the film 17, resulting from the shaping, were minimized. Note that the elongation of the film 17 was equivalent to the sum of the displacement magnitudes, which are specified by the arrows of FIG. 9, that is, the distances between film 17 and the first-irregular-inner-surface molding cavity surface 13. Then, the film 17 was shaped with the first-irregular-inner-surface molding cavity surface 13.

Hence, even when the first-irregular-inner-surface molding cavity surface 13 was a curved surface, it was possible to make the elongation of the shaped film 17 not only substantially constant but also much smaller over the entire shaped film 17.

Except for the above-described arrangements, operation and advantage, the production process according to Example No. 2 of the present invention operates to effect advantages in the same manner as Example No. 1.

Modified Version

Note that, in Example Nos. 1 and 2, a specific example was described in which the transparent resinous layer 5 was formed simultaneously with the shaping of the film 17 in the primary molding step. However, the present invention is not limited to the specific example at all. For instance, the transparent resinous layer 5 can be completed in the following stepwise manner: in the primary molding step, the transparent resinous layer 5 is first molded; the film 17 is shaped with the resulting resinous layer 5's first irregular inner surface 4 and the first stationary mold 14's first-irregular-inner-surface molding cavity surface 13; and thereafter the film substrate 18 is removed to form the decorative layer 8 integrally with the first irregular inner surface 4 by means of transfer.

Also note that, in Example Nos. 1 and 2, a specific example was described in which only the decorative layer 8 was formed integrally with the first irregular inner surface 4 by means of transfer and thereby only the decorative layer 8 was disposed between the transparent resinous layer 5 and the substrate layer 7. However, the present invention is not limited to the specific example at all. For instance, it is advisable to leave the film substrate 18 between the transparent resinous layer 5 and the substrate layer 7 as it is without separating the film substrate 18 from the printed membrane 19 after shaping the film 17. If such is the case, it is possible to further upgrade the decorativeness of the resultant electric-waves transmittable cover member 3 by providing colors or patterns, which are different from those of the decorative layer 8, for the film substrate 18.

Moreover, it is advisable to employ a decorative layer or a functional layer, which comprises a metallic deposition film made of indium, as the claimed decorated layer, instead of the decorative layer 8, which comprised the printed membrane 19.

In addition, it should be noted that the materials for making the present resinous laminated member as well as the characteristics or colors (or transparencies) of the materials are not limited in particular.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing a resinous laminated member, in which the resinous laminated member is formed as a laminated structure that includes:

a first resinous layer having a first inner surface;

a second resinous layer disposed on the first inner surface of the first resinous layer and having a second inner surface conforming to and at the same time facing the first inner surface, wherein the second resinous layer further has an engaging projection extending from a rear surface of the second resinous layer, which is on an opposite side of the second resinous layer from the second inner surface, at a predetermined oblique angle with respect to an extending direction of the first inner surface and the second inner surface, and wherein the oblique angle is greater than 90°; and a decorated layer disposed between the first inner surface of the first resinous layer and the second inner surface of the second resinous layer, the process comprising:

a primary molding step of molding the first resinous layer and at the same time forming the first resinous layer integrally with the decorated layer while shaping the decorated layer in the first inner surface of the first resinous layer by means of a film in-mold method in which a film including a constituent element of the decorated layer in part thereof at least is disposed in a first forming mold and the first resinous layer is molded within the first forming mold, wherein the first forming mold is provided with a first-inner-surface molding cavity surface having a configuration corresponding to the first inner surface of the first resinous layer, thereby obtaining a primary molded product;

a secondary molding step of disposing the primary molded product in a second forming mold and molding the second resinous layer within the second forming mold to form the second resinous layer integrally with the primary molded product, thereby producing the resinous laminated member, wherein:

the primary molding step comprises:

a shaping step of shaping the film so as to conform to the first inner surface of the first resinous layer with the first-inner-surface molding cavity surface of the first forming mold, the film being extended in a direction substantially parallel to an extending direction of the first-inner-surface molding cavity; and a primary removing step of removing the primary molded product completely from the first forming mold in a first removal direction, which is substantially perpendicular to the extending direction of the first inner surface of the resulting first resinous layer, wherein the first removal direction is the same as a direction in which the first forming mold is opened; and the secondary molding step comprising:

a secondary disposing step of fitting the primary molded product into the second forming mold, which is different from the first forming mold, so that the first inner surface of the first resinous layer of the primary molded product is inclined with respect to the extending direction of the engaging projection by an angle that is equal to the oblique angle in the second forming mold; and a secondary removing step of removing the resinous laminated member from the second forming mold in a second removal direction, which is parallel to the extending direction of the engaging projection of the second resinous layer, wherein the second removal direction is the same as a direction in which the second forming mold is opened, wherein a mold opening direction of the first forming mold is the same as a mold opening direction of the second forming mold.

2. The process set forth in claim 1, wherein:

the first inner surface comprises a first irregular inner surface having a first irregularity;

the second inner surface comprises a second irregular inner surface having a second irregularity, which conforms to the first irregularity of the first irregular inner surface in the first inner surface; and the first-inner-surface molding cavity surface of the first forming mold comprises a molding cavity surface for molding the first irregular inner surface.

3. The process set forth in claim 1, wherein the film, which is disposed to extend substantially parallel to the extending direction of the first-inner-surface molding cavity surface of the first forming mold, is shaped with the first-inner-surface molding cavity surface in the shaping step of the primary molding step.

4. The process set forth in claim 1, wherein the film, which is disposed to extend so that approximate magnitudes, which are found by a least-squares method for estimating the elongation of the film resulting from the shaping, are minimized, is shaped with the first-inner-surface molding cavity surface in the shaping step of the primary molding step.

5. The process set forth in claim 1, wherein:

the film comprises a film substrate, and the constituent element of the decorated layer formed on the film substrate; and the constituent element is transferred onto the first inner surface of the first resinous layer in the primary molding step, thereby forming the decorative layer integrally on the first inner surface.

6. The process set forth in claim 2, wherein:

the first resinous layer is composed of a transparent resin; and the decorated layer comprises a decorative layer, which is disposed in one of dents of the first irregular inner surface of the first inner surface in the first resinous layer.

7. The process set forth in claim 1, wherein:

the first resinous layer further has a first outer surface, which inclines in a direction that is substantially parallel to the first inner surface; and the resinous laminated member is an electric-waves transmittable cover member.

8. The process set forth in claim 1, wherein:

the extending direction of the first inner surface and the second inner surface in the produced laminated resinous member incline by the predetermined angle with respect to an extending direction of the engaging projection; and the primary molded product is inclined in the clockwise direction by a clockwise inclination angle equal to the predetermined angle in the secondary disposing step of the secondary molding step.

9. The process set forth in claim 1, wherein the first removal direction is generally perpendicular to the first inner surface of the first resinous layer, and the second removal direction is inclined by the predetermined oblique angle with respect to the extending direction of the first inner surface and the second inner surface.

\* \* \* \* \*